US010324901B2

(12) United States Patent
Kuruganti et al.

(10) Patent No.: US 10,324,901 B2
(45) Date of Patent: *Jun. 18, 2019

(54) SYSTEM, METHOD AND COMPUTER PROGRAM PRODUCT FOR SHARING TENANT INFORMATION UTILIZING A MULTI-TENANT ON-DEMAND DATABASE SERVICE

(71) Applicant: salesforce.com, inc., San Francisco, CA (US)

(72) Inventors: Aditya S. Kuruganti, San Francisco, CA (US); Kedar Doshi, Palo Alto, CA (US); Chaitanya Bhatt, Union City, CA (US); Sanjaya Lai, South San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,280

(22) Filed: Feb. 29, 2016

(65) Prior Publication Data

US 2016/0248776 A1     Aug. 25, 2016

Related U.S. Application Data

(63) Continuation of application No. 14/490,579, filed on Sep. 18, 2014, now Pat. No. 9,275,253, which is a
(Continued)

(51) Int. Cl.
*H04L 29/06* (2006.01)
*G06F 16/21* (2019.01)
(Continued)

(52) U.S. Cl.
CPC ............ *G06F 16/176* (2019.01); *G06F 16/21* (2019.01); *G06F 16/27* (2019.01); *G06F 16/955* (2019.01); *G06F 21/6227* (2013.01); *H04L 63/10* (2013.01)

(58) Field of Classification Search
CPC .. G06F 17/30165; G06F 21/121; G06F 21/62; G06F 21/6227; H04L 63/10
(Continued)

(56) References Cited

U.S. PATENT DOCUMENTS 5,577,188 A    11/1996 Zhu
5,608,872 A    3/1997 Schwartz et al.
(Continued)

OTHER PUBLICATIONS

U.S. Appl. No. 14/197,154—Office Action dated Mar. 23, 2015, 14 pages.
(Continued)

*Primary Examiner* — James Trujillo
*Assistant Examiner* — Jessica N Le
(74) *Attorney, Agent, or Firm* — Sterne, Kessler, Goldstein & Fox P.L.L.C.

(57) ABSTRACT

In accordance with embodiments, there are provided mechanisms and methods for sharing tenant information utilizing a multi-tenant on-demand database service. These mechanisms and methods for sharing tenant information utilizing a multi-tenant on-demand database service can allow automatic sharing of information owned by a first tenant with other tenants of the multi-tenant on-demand database service. In this way, collaboration among tenants of the multi-tenant on-demand database service may be enabled via the sharing of the tenant information.

17 Claims, 9 Drawing Sheets

Related U.S. Application Data continuation of application No. 13/886,200, filed on May 2, 2013, now Pat. No. 8,868,605, which is a continuation of application No. 13/554,905, filed on Jul. 20, 2012, now Pat. No. 8,560,571, which is a continuation of application No. 12/437,459, filed on May 7, 2009, now Pat. No. 8,478,782.

(60) Provisional application No. 61/051,589, filed on May 8, 2008.

(51) Int. Cl.
*G06F 16/27* (2019.01)
*G06F 16/176* (2019.01)
*G06F 16/955* (2019.01)
*G06F 21/62* (2013.01)

(58) Field of Classification Search
USPC .......................................... 707/608, 781–788
See application file for complete search history.

(56) References Cited

U.S. PATENT DOCUMENTS

| | | | |
|---|---|---|---|
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,956,754 | A | 9/1999 | Kimmel |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,539,379 | B1 * | 3/2003 | Vora .................. G06F 17/30554 |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,069,270 | B1 | 6/2006 | Kumar |
| 7,069,497 | B1 | 6/2006 | Desai |
| 7,181,758 | B1 | 2/2007 | Chan |
| 7,209,929 | B2 | 4/2007 | Dominguez, Jr. et al. |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,503,031 | B2 | 3/2009 | Chang et al. |
| 7,508,789 | B2 | 3/2009 | Chan |
| 7,603,483 | B2 | 10/2009 | Psounis et al. |
| 7,603,569 | B2 | 10/2009 | Maeda et al. |
| 7,620,655 | B2 | 11/2009 | Larsson et al. |
| 7,698,160 | B2 | 4/2010 | Beaven et al. |
| 7,779,039 | B2 | 8/2010 | Weissman et al. |
| 7,779,475 | B2 | 8/2010 | Jakobson et al. |
| 7,851,004 | B2 | 12/2010 | Hirao et al. |
| 7,865,521 | B2 | 1/2011 | Bird et al. |
| 8,001,611 | B2 | 8/2011 | Nelson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,724 | B2 | 12/2011 | Harthcryde et al. |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,209,333 | B2 | 6/2012 | Hubbard et al. |
| 8,249,904 | B1 | 8/2012 | DeSantis et al. |
| 8,271,536 | B2 | 9/2012 | Amradkar et al. |
| 8,275,836 | B2 | 9/2012 | Beaven et al. |
| 8,407,576 | B1 | 3/2013 | Yin et al. |
| 8,457,545 | B2 | 6/2013 | Chan |
| 8,478,782 | B1 | 7/2013 | Kuruganti et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 8,713,043 | B2 | 4/2014 | Hess |
| 8,756,275 | B2 | 6/2014 | Jakobson |
| 8,769,004 | B2 | 7/2014 | Jakobson |
| 8,769,017 | B2 | 7/2014 | Jakobson |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0161602 | A1 | 10/2002 | Dougherty et al. |
| 2002/0162090 | A1 | 10/2002 | Parnell et al. |
| 2002/0165742 | A1 | 11/2002 | Robins |
| 2003/0004971 | A1 | 1/2003 | Gong et al. |

(56) References Cited

U.S. PATENT DOCUMENTS

| | | |
|---|---|---|
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2003/0236977 A1* | 12/2003 | Levas .................. G06F 21/33 713/158 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0024819 A1* | 2/2004 | Sasaki ................ H04L 12/1813 709/205 |
| 2004/0027388 A1 | 2/2004 | Berg et al. |
| 2004/0064704 A1 | 4/2004 | Rahman |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1* | 3/2005 | Weissman .......... G06F 17/30442 |
| 2005/0091098 A1 | 4/2005 | Brodersen et al. |
| 2005/0091316 A1* | 4/2005 | Ponce .................. H04L 63/104 709/205 |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0123010 A1 | 6/2006 | Landry et al. |
| 2006/0206834 A1* | 9/2006 | Fisher ................ G06F 17/30528 715/777 |
| 2007/0088741 A1* | 4/2007 | Brooks .................... G06F 8/68 |
| 2007/0255715 A1 | 11/2007 | Li et al. |
| 2007/0288614 A1* | 12/2007 | May ................ G06F 17/30578 709/223 |
| 2007/0288890 A1 | 12/2007 | Wells |
| 2008/0010243 A1 | 1/2008 | Weissman et al. |
| 2008/0034038 A1* | 2/2008 | Ciudad ................ G06Q 10/107 709/204 |
| 2008/0162491 A1 | 7/2008 | Becker et al. |
| 2008/0249972 A1 | 10/2008 | Dillon |
| 2009/0024488 A1 | 1/2009 | Romley |
| 2009/0024931 A1* | 1/2009 | Bae .................... G06F 21/6218 715/748 |
| 2009/0025063 A1 | 1/2009 | Thomas |
| 2009/0030906 A1 | 1/2009 | Doshi et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0271708 A1* | 10/2009 | Peters .................... G06F 17/24 715/738 |
| 2009/0300213 A1 | 12/2009 | Khuti et al. |
| 2010/0024015 A1* | 1/2010 | Hardt .................... H04L 67/14 726/6 |
| 2010/0077214 A1 | 3/2010 | Jogand-Coulomb et al. |
| 2010/0211548 A1 | 8/2010 | Ott et al. |
| 2011/0099621 A1 | 4/2011 | Lizarraga et al. |
| 2011/0126168 A1 | 5/2011 | Ilyayev |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0033067 A1* | 1/2014 | Pittenger ............... G06F 21/606 715/751 |
| 2014/0188939 A1 | 7/2014 | Hess |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

U.S. Appl. No. 13/021,669—Office Action dated Feb. 21, 2013, 13 pages.

U.S. Appl. No. 13/021,669—Notice of Allowance, dated Dec. 26, 2013, 5 pages.

U.S. Appl. No. 13/021,669—Office Action, dated Sep. 24, 2012, 10 pages.

U.S. Appl. No. 13/021,669—Office Action, dated May 2, 2013, 11 pages.

U.S. Appl. No. 13/021,669—Office Action, dated Sep. 10, 2013, 18 pages.

* cited by examiner

SYSTEM, METHOD AND COMPUTER PROGRAM PRODUCT FOR SHARING TENANT INFORMATION UTILIZING A MULTI-TENANT ON-DEMAND DATABASE SERVICE

CLAIM OF PRIORITY

The present application is a continuation of U.S. application Ser. No. 14/490,579, filed Sep. 18, 2014 (now U.S. Pat. No. 9,275,253), which is a continuation of U.S. application Ser. No. 13/886,200, filed May 2, 2013 now U.S. Pat. No. 8,868,605), which is a continuation of U.S. application Ser. No. 13/554,905, filed Jul. 20, 2012 (now U.S. Pat. No. 8,560,571), which is a continuation of U.S. application Ser. No. 12/437,459, filed May 7, 2009 now U.S. Pat. No. 8,478,782), which claims priority to U.S. Provisional Appl. No. 61/051,589, filed May 8, 2008 the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing information, and more particularly to sharing information across businesses.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, information stored in a database is generally accessible to users with privileges to such database. For example, the information may include information owned by the company, where only the company has access to the information. Unfortunately, techniques for allowing database information to be shared among different owners have traditionally been limited.

For example, each owner is typically associated with a separate database (e.g. on a separate network, etc.), thus preventing sharing of information via a single database and/or network location storing such information. As another example, owners have generally been required to manually provide information to other owners, for sharing the same, such that automated sharing has been unavailable.

BRIEF SUMMARY

In accordance with embodiments, there are provided mechanisms and methods for sharing tenant information utilizing a multi-tenant on-demand database service. These mechanisms and methods for sharing tenant information utilizing a multi-tenant on-demand database service can allow automatic sharing of information owned by a first tenant with other tenants of the multi-tenant on-demand database service. In this way, collaboration among tenants of the multi-tenant on-demand database service may be enabled via the sharing of the tenant information.

In an embodiment and by way of example, a method is provided for sharing tenant information utilizing a multi-tenant on-demand database service. In use, an indication of permission to share a portion of first tenant information with a second tenant is received from a first tenant, the first tenant information managed using a multi-tenant on-demand database service, wherein the second tenant is otherwise blocked from accessing the portion of first tenant information absent the indication of permission. Further, the second tenant is permitted to access the portion of first tenant information based on the indication of permission.

While the present invention is described with reference to an embodiment in which techniques for sharing tenant information utilizing a multi-tenant on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 3 shows a graphical user interface for sharing an account of a first tenant with a second tenant, in accordance with another embodiment.

FIG. 7 shows a graphical user interface for accepting a shared contact, in accordance with yet another embodiment.

DETAILED DESCRIPTION

General Overview

Systems and methods are provided for sharing tenant information utilizing a multi-tenant on-demand database service.

To date, information stored in a database is generally accessible to owners of such database. Unfortunately, techniques for allowing database information to be shared among different owners have traditionally been limited. Thus, mechanisms and methods are provided herein for sharing tenant information utilizing a multi-tenant on-demand database service and can allow automatic sharing of information owned by a first tenant with other tenants of the multi-tenant on-demand database service, such that, for example, collaboration among tenants of the multi-tenant on-demand database service may be enabled via the sharing of the tenant information.

Next, mechanisms and methods for sharing tenant information utilizing a multi-tenant on-demand database service will be described with reference to exemplary embodiments.

Figure 1:
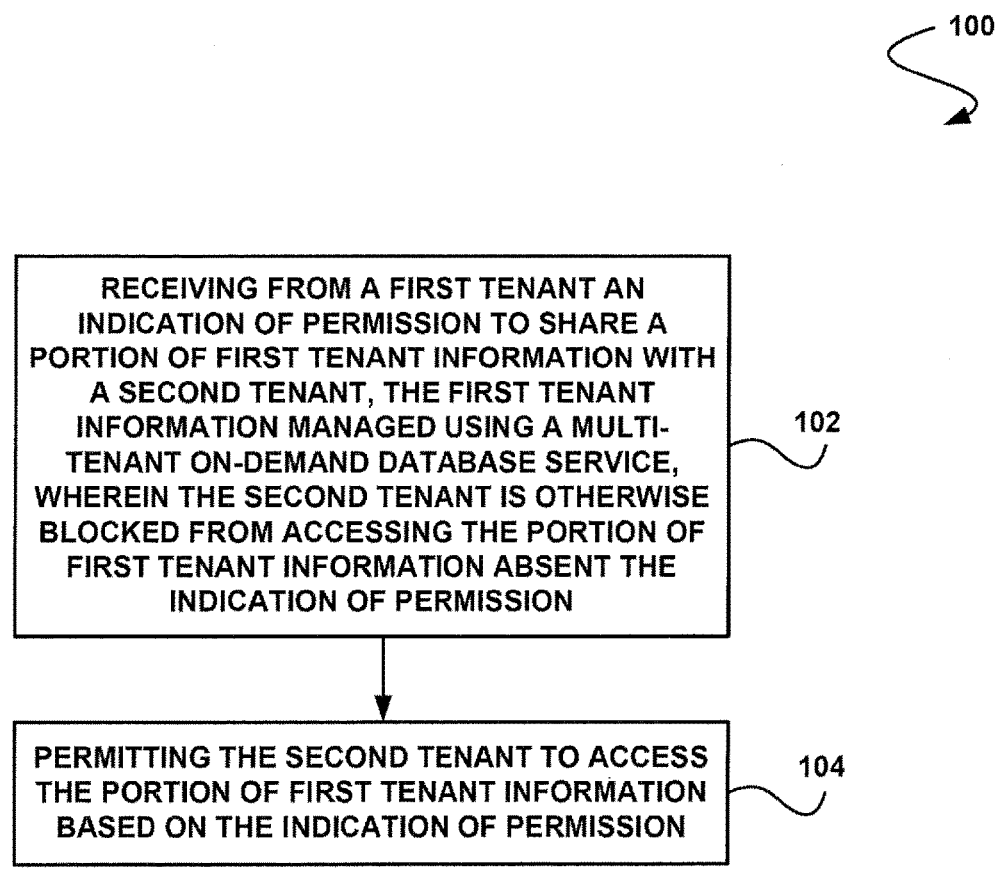
FIG. 1 shows a method for sharing tenant information utilizing a multi-tenant on-demand database service, in accordance with one embodiment.

FIG. 1 shows a method 100 for sharing tenant information utilizing a multi-tenant on-demand database service, in accordance with one embodiment. As shown, an indication of permission to share a portion of first tenant information with a second tenant is received from a first tenant, the first tenant information managed using a multi-tenant on-demand database service, where the second tenant is otherwise blocked from accessing the portion of first tenant information absent the indication of permission. See operation 102.

With respect to the present embodiment, the first tenant from which the indication of permission is received may include any tenant of the multi-tenant on-demand database service. For example, the first tenant may include a company and/or any other entity with information (herein referred to as first tenant information) managed by the multi-tenant on-demand database service. In one embodiment, the multi-tenant on-demand database service may manage the first tenant information by storing the first tenant information in a database of the multi-tenant on-demand database service, permitting sharing of the first tenant information (as described herein), etc.

Additionally, the second tenant for which the indication of permission is received may include any tenant capable of accessing at least a portion of the first tenant information, based on the indication of permission provided by the first tenant. In one embodiment, similar to the first tenant, the second tenant may also be a tenant of the multi-tenant on-demand database service, such that the second tenant may optionally include a company and/or any other entity with information (herein referred to as second tenant information) managed by the multi-tenant on-demand database service. To this end, the first tenant and the second tenant may include different tenants of the multi-tenant on-demand database service.

Of course, in another embodiment, the second tenant may be a tenant outside of the on-demand database service. Thus, the second tenant information may not necessarily be managed by the multi-tenant on-demand database service. For example, the second tenant information may be stored in a database separate from the multi-tenant on-demand database service (e.g. may be stored in a database locally owned by the second tenant, may be stored in a database provided by a third party web service, etc.).

It should be noted that with respect to the present embodiment, the multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

As noted above, the first tenant information may include any information managed by the multi-tenant on-demand database service on behalf of the first tenant. For example, the first tenant information may describe a business of the first tenant. As another example, the first tenant information may include a plurality of records. In various embodiments, the first tenant information may include tasks, accounts, contacts, products, opportunities, cases, comments and/or any other objects (e.g. custom objects, etc.) capable of being associated with the first tenant (e.g. where each is stored as a separate record, etc.).

Accordingly, the portion of first tenant information (for which the indication of permission to share the same with the second tenant is received) may include a subpart of the first tenant information or an entirety of the first tenant information. In one embodiment, the indication of permission may only be for a single record of the first tenant information (e.g. a single task, account, contact, etc.). In another embodiment, the indication of permission may be for a group of records of the first tenant information. For example, the group of records may include records (e.g. child records) grouped under a parent record. In still yet another embodiment, the indication of permission may be for the entirety of the first tenant information.

Moreover, the indication of permission to share the portion of first tenant information may include any type of indicator capable of being received from the first tenant for indicating that the second tenant is permitted to share the portion of first tenant information. As an option, the indication of permission may include an identifier of the portion of first tenant information that is being permitted by the first tenant to be shared with the second tenant. As another option, if the indication of permission is to share a parent record, such indication may automatically an indication of permission to share child records of such parent record. As yet another option, the indication of permission may include an identifier of the second tenant with which the portion of first tenant information is to be shared.

In one embodiment, the indication of permission may be received from the first tenant via a graphical user interface (GUI) of the multi-tenant on-demand database service. For example, a graphical user interface displaying details of the portion of first tenant information (e.g. a particular record or optionally a plurality of records of a certain type, such as tasks, contacts, etc.) may include a configurable option (e.g. for each displayed record, for all displayed records, etc.) capable of being configured by the first tenant for indicating that such portion of first tenant information is to be shared with the second tenant. By configuring the option, the indication of permission may be received from the first tenant (e.g. by the multi-tenant on-demand database service).

Just by way of example, the configurable option may include a drop down menu associated with the portion of first tenant information which displays an identifier of the second tenant (and optionally other tenants with which the portion of first tenant information may be shared), such that selection of the identifier of the second tenant via the drop down menu results in receipt of the indication of permission to share the portion of first tenant information with the second tenant.

As noted above, the indication of permission may be for the portion of first tenant information to be shared with the second tenant, where the second tenant would otherwise be blocked from accessing the portion of first tenant information absent such indication of permission. For example, the second tenant may be blocked from accessing the portion of first tenant information by preventing the second tenant from having access to a database storing the portion of first tenant information, preventing the second tenant from having access to a GUI utilized to display the portion of first tenant, etc. In this way, the indication of permission may enable access to the portion of first tenant information which is otherwise blocked with respect to the second tenant.

Further, the second tenant is permitted to access the portion of first tenant information based on the indication of permission. See operation 104. In this way, upon receipt of the indication of permission, the second tenant may be permitted to access the portion of the first tenant information. In various embodiments, permitting the second tenant to access the portion of first tenant information may include permitting the second tenant to view, update, etc. the portion of first tenant information.

As another option, permitting the second tenant to access the portion of first tenant information may include permitting the second tenant to store the portion of first tenant information in association with information associated with the second tenant (e.g. the second tenant information). For example, upon receipt of the indication of permission to share the portion of first tenant information with the second tenant, the portion of first tenant information may be automatically inserted and linked to a parent record of the second tenant. Of course, as another example, the portion of first tenant information may be automatically stored as anew record of the second tenant.

As an option, the access to the portion of first tenant information may be permitted via the multi-tenant on-demand database service. For example, if the second tenant is a tenant of the multi-tenant on-demand database service, the second tenant may be permitted to access the portion of first tenant information utilizing a GUI of the multi-tenant on-demand database service. As another example, if the second tenant is a tenant outside of the multi-tenant on-demand database service, access to the portion of first tenant information may be provided utilizing a mark-up language [e.g. Extensible Markup Language (XML), etc.].

It should be noted that tenant information of one tenant may be permitted by such tenant to be shared with any number of other tenants (whether or not such tenants are tenants of the multi-tenant on-demand database service). For example, another indication of permission to share the portion of first tenant information with a third tenant may be received from the first tenant. Furthermore, the third tenant may be permitted to access the portion of first tenant information based on the other indication of permission. As an option, permitting the second tenant to access the portion of first tenant information and permitting the third tenant to access the portion of first tenant information may be separate, such that subsequently blocking one of the same may prevent an impact on the other. Thus, for example, the second tenant may continue to be permitted to access the portion of first tenant information even after the second tenant's access to the portion of first tenant information is blocked (e.g. by the first tenant).

As another option, reciprocity of sharing of tenant information may also be provided between tenants. For example, another indication of permission to share a portion of the second tenant information with the first tenant may be received from the second tenant, where the second tenant information is managed by the multi-tenant on-demand database service and where the first tenant is otherwise blocked from accessing the portion of second tenant information absent the other indication of permission. As a result, the first tenant may be permitted to access the portion of second tenant information based on the indication of permission, such that reciprocity of sharing of tenant information is provided between the first tenant and the second tenant.

As still yet another option, real-time updates on the shared data may be provided. For example, if the portion of first tenant information is updated by the first tenant, the update may be automatically visible to the second tenant sharing such portion of first tenant information. As another example, if the portion of first tenant information is updated by the second tenant sharing the portion of first tenant information, second tenant sharing such portion of first tenant information first tenant.

As an option, an application program interface (API) may be provided for use by the multi-tenant on-demand database service for automatically indicating permission and blocking already established permission to tenant information for particular tenants. For example, predefined rules may be used to automatically provide an indication of permission to share particular tenant information or an indication to block sharing of particular tenant information with certain tenants.

To this end, by permitting the second tenant to access the portion of first tenant information based on the indication of permission received from the first tenant, business collaboration both within and across tenants may be provided. For example, such tenants may be enabled to share leads, opportunities, cases and other information, as noted above.

Figure 2:
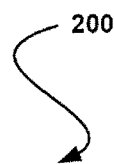
FIG. 2 shows a graphical user interface for sharing a task of a first tenant with a second tenant, in accordance with another embodiment.

FIG. 2 shows a GUI 200 for sharing a task of a first tenant with a second tenant, in accordance with another embodiment. As an option, the present GUI 200 may be implemented in the context of the functionality of FIG. 1. Of course, however, the GUI 200 may be implemented in any desired environment. The aforementioned definitions may apply during the present description.

With respect to the present GUI 200, a tenant with privileges to access such GUI 200 may be able to utilize such GUI 200 to share any task (e.g. including tasks linked to a shared parent record), including a new task, a task for logging a call, a task for sending an email, etc. For example, the tenant may include an original owner (e.g. may have originally created) the tasks displayed via the GUI 200. Standalone tasks where the parent is not shared may optionally be prevented from being shared among tenants. In order to share a task, various fields of the task may optionally be required to be configured, such as a subject of a publish field of the task, a subject of a subscribe field of the task, etc.

Also with respect to the present GUI 200, the tenant may be capable of sharing with other tenants any open and/or closed tasks when sharing the parent record. As shown, the GUI 200 may be used to share the task with another tenant. Of course, it should be noted that while not shown, the GUI 200 may optionally be utilized to share a task with a plurality of other tenants. Once an indication of permission to share a task with another tenant is made via the GUI 200, the task may be automatically inserted and linked to the other tenant's parent record. Optionally, the parent record's owner field may be used to set the owner of the task. As another option, the owner's default record type may be used to set the record type of the task.

As also shown, the ability to share a task may be available via the Open Activity (or Activity History) related list on the parent record. The tenant may have the option to share the task with any other tenants with which the parent record is shared. If the task has multiple parent records, visibility of other tenants with which the task may be shared may be driven by the parent from which the tenant has accessed the GUI 200. Options to share the task (via the "forward" drop down menu as shown) or block access to an otherwise shared task may also be provided via the GUI 200. Such options may be visible via the GUI 200 if sharing is enabled for the tenant (e.g. enabled by the multi-tenant on-demand database service), the parent record is currently shared with at least one other tenant, and if the task is both published and subscribed with the other tenant on the parent record associated with the task (e.g. from which the GUI 200 displaying the task was accessed).

As noted above, the GUI 200 may be used by the tenant to block (e.g. deactivate, etc.) sharing of an otherwise shared task (whether opened or closed) at any time for a particular tenant with which the task is shared, all tenants with which the task is shared, etc. Sent and received indications of permission to share a task may also be displayed in association with the task, as an option.

In some embodiments, a task may have multiple parents. Thus, if sharing is terminated on any parent record associated with the task, sharing with a particular tenant may remain on the task if any of the parent records of the tenant or the particular tenant are still shared. Otherwise, sharing may be terminated with termination of the sharing of the parent record between the tenant and such other particular tenant. Additionally, since a task may be shared with one or more tenants, sharing with one tenant may be deactivated without impacting the sharing with the other tenant.

Figure 3:
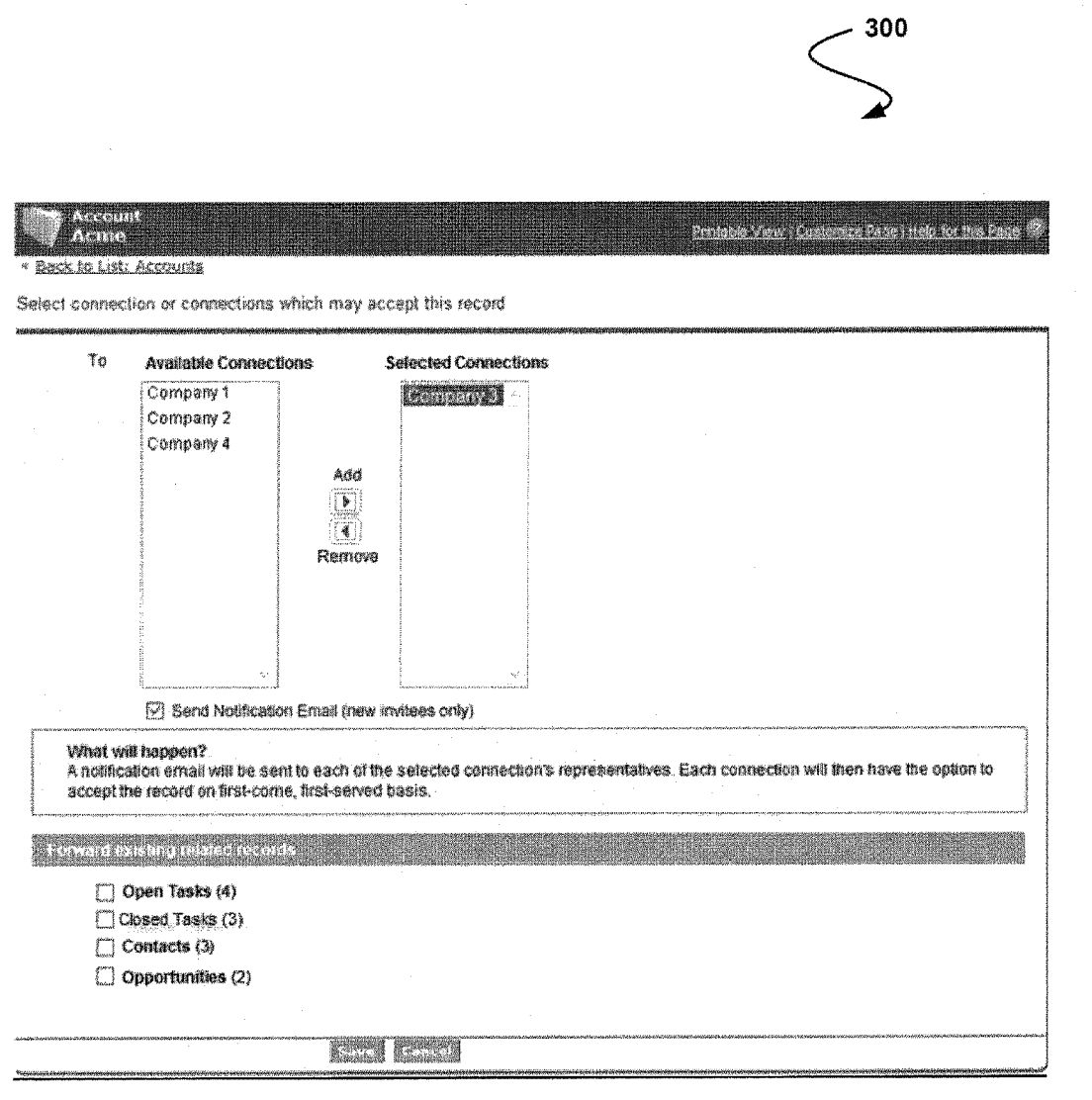

FIG. 3 shows a GUI 300 for sharing an account of a first tenant with a second tenant, in accordance with another embodiment. As an option, the present GUI 300 may be implemented in the context of the functionality of FIGS. 1-2. Of course, however, the GUI 300 may be implemented in any desired environment. Again, the aforementioned definitions may apply during the present description.

As shown, the GUI 300 may be used to allow collaboration between tenants on accounts (e.g. customer accounts, etc.). For example, the tenants may optionally share both business and person accounts with other tenants. In order to share an account, various fields of the account may optionally be required to be configured, such as a name on a publish field of the account (e.g. a last name field of a person account), a name of a subscribe field of the account (e.g. a last name field of a person account), etc.

Further, an indication of permission to share each account may be provided via the GUI 300. In one embodiment, an option of the GUI 300 may be manually selected for indication such permission. As shown, for a particular account, the GUI 300 may be utilized to select the tenants (connections as shown) with which the account is to be shared. In particular, the tenants may be selected from a list of available tenants. Of course, in another embodiment (not shown), the indication of such permission may be automatically provided for sharing an account with a tenant, for example, based on predefined rules.

Upon indicating permission to share the account with another tenant, a notification may be sent to such tenant (e.g. representatives of the tenant). The notification may notify the tenant that access to the account is available, and the tenant may be provided with the opportunity to accept the access provided to the account, as described in more detail with respect to FIGS. 4 and/or 5, for example.

When sharing an account, a tenant may select options of the GUI 300 to also share records related to the account (e.g. child records of the parent account). In one embodiment, the GUI 300 may include an option to share all related records (not shown), or the GUI 300 may include multiple options to share related records, in order of a predetermined priority of each type of related record, including open and/or closed tasks related to the account, opportunities associated with the account (such as only those not already shared), contacts associated with the account (only those not already shared), etc.

Figure 4:
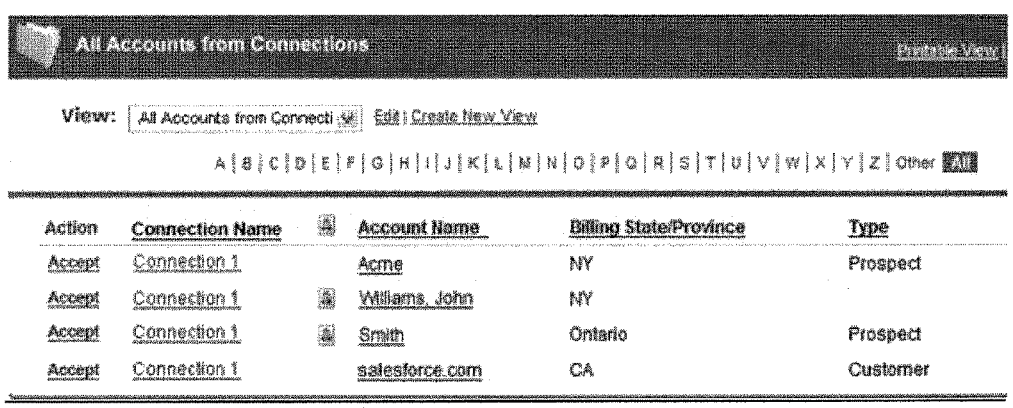
FIG. 4 shows a graphical user interface for displaying shared accounts, in accordance with yet another embodiment.

FIG. 4 shows a GUI 400 for displaying shared accounts, in accordance with yet another embodiment. As an option, the present GUI 400 may be implemented in the context of the functionality of FIGS. 1-3. Of course, however, the GUI 400 may be implemented in any desired environment. Again, the aforementioned definitions may apply during the present description.

As shown, the GUI 400 displays a list of accounts for which sharing with a second tenant has been permitted by a first tenant. Thus, the GUI 400 may be accessible by the second tenant. In association with each account is information associated with such account (e.g. name of account, billing city/state/country of account, type of account, connection name associated with the account, date in which the sharing was permitted by the first tenant, etc.), in addition to an option for the second tenant to accept the sharing of the account.

To this end, the second tenant may accept one account at a time, in one embodiment. Upon acceptance of sharing of an account, another GUI (e.g. shown in FIG. 5) may be displayed to the second tenant for allowing the second tenant to configure how the account is saved with respect to information of the second tenant.

Figure 5:
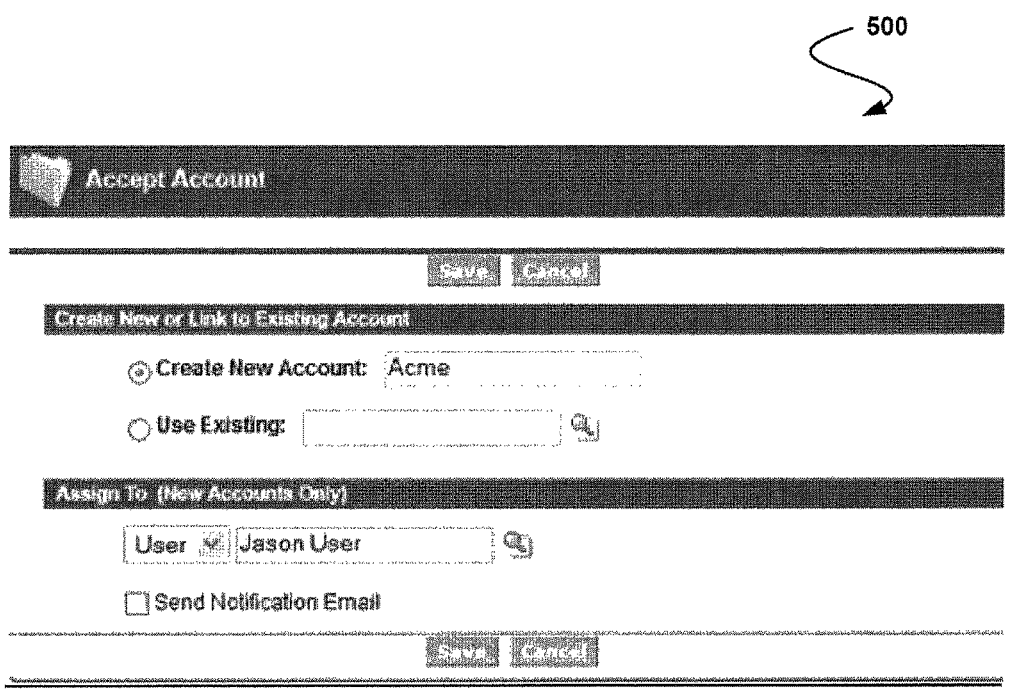
FIG. 5 shows a graphical user interface for accepting a shared account, in accordance with still yet another embodiment.

FIG. 5 shows a GUI 500 for accepting a shared account, in accordance with still yet another embodiment. As an option, the present GUI 500 may be implemented in the context of the functionality of FIGS. 1-4. Of course, however, the GUI 500 may be implemented in any desired environment. Again, the aforementioned definitions may apply during the present description.

As shown, various options may be provided via the GUI 500 for accepting sharing of an account. In one embodiment, the sharing of the account may be accepted by creating the account as a new account. As an option, the account may be created by entering an account record type. In another embodiment, the sharing of the account may be accepted by selecting an existing account (e.g. of the tenant accessing the GM 500) with which the shared account is to be integrated.

As another option, if a new account is created via the GUI 500, as described above, a user (of the tenant) to which the account is assigned may be configured. The GUI 500 may also provide an option to send a notification (e.g. email) to such user informing the user of the new account.

In other various embodiments (not necessarily limited to the present GUI 500), sent and received connection name fields may be available for the account (person account) object. Additionally, the same fields may also be made available to show a message at the top of a shared record. Further, a history may also be displayed (via reports, via a GUI, etc.) in which updates on accounts, records, etc. from other tenants with which such accounts, records, etc. are shared are tracked.

Figure 6:
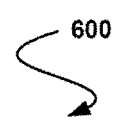
FIG. 6 shows a graphical user interface for displaying shared contacts, in accordance with another embodiment.

FIG. 6 shows a GUI 600 for displaying shared contacts, in accordance with another embodiment. As an option, the present GUI 600 may be implemented in the context of the functionality of FIGS. 1-5. Of course, however, the GUI 600 may be implemented in any desired environment. Again, the aforementioned definitions may apply during the present description.

Collaboration between tenants on contacts (e.g. customer contacts, etc.) may be provided via a GUI (not shown). For example, the tenants may optionally share both business and person contacts with other tenants. In order to share a contact, various fields of the contact may optionally be required to be configured, such as a name on a publish field of the contact, a name of a subscribe field of the contact, etc.

Further, an indication of permission to share each contact may be provided via a GUI (not shown). In one embodiment, an option of the GUI may be manually selected for indication such permission. As shown, for a particular contact, the GUI may be utilized to select the tenants (connections) with which the contact is to be shared. In particular, the tenants may be selected from a list of available tenants. Of course, in another embodiment (not shown), the indication of such permission may be automatically provided for sharing a contact with a tenant, for example, based on predefined rules.

Upon indicating permission to share the contact with another tenant, a notification may be sent to such tenant (e.g. representatives of the tenant). The notification may notify the tenant that access to the contact is available, and the tenant may be provided with the opportunity to accept the access provided to the contact, as shown with respect to the present GUI 600.

When sharing a contact, a tenant may select options (not shown) to also share records related to the contact (e.g. child records of the parent contact). In one embodiment, an option to share all related records may be provided, or multiple options may be provided to share related records, in order of a predetermined priority of each type of related record, including open and/or closed tasks related to the contact, opportunities associated with the contact (such as only those not already shared), accounts associated with the contact (only those not already shared), etc.

As shown, the GUI 400 displays a list of contacts for which sharing with a second tenant has been permitted by a first tenant. Thus, the GUI 400 may be accessible by the second tenant. In association with each contact is information associated with such contact (e.g. name of contact, name of account associated with the contact, billing city/state/country of account associated with the contact, email of the contact, phone number of the contact, connection name associated with the contact, date in which the sharing was permitted by the first tenant, etc.), in addition to an option for the second tenant to accept the sharing of the contact.

To this end, the second tenant may accept one contact at a time, in one embodiment. Upon acceptance of sharing of a contact, another GUI (e.g. shown in FIG. 7) may be displayed to the second tenant for allowing the second tenant to configure how the contact is saved with respect to information of the second tenant.

Figure 7:
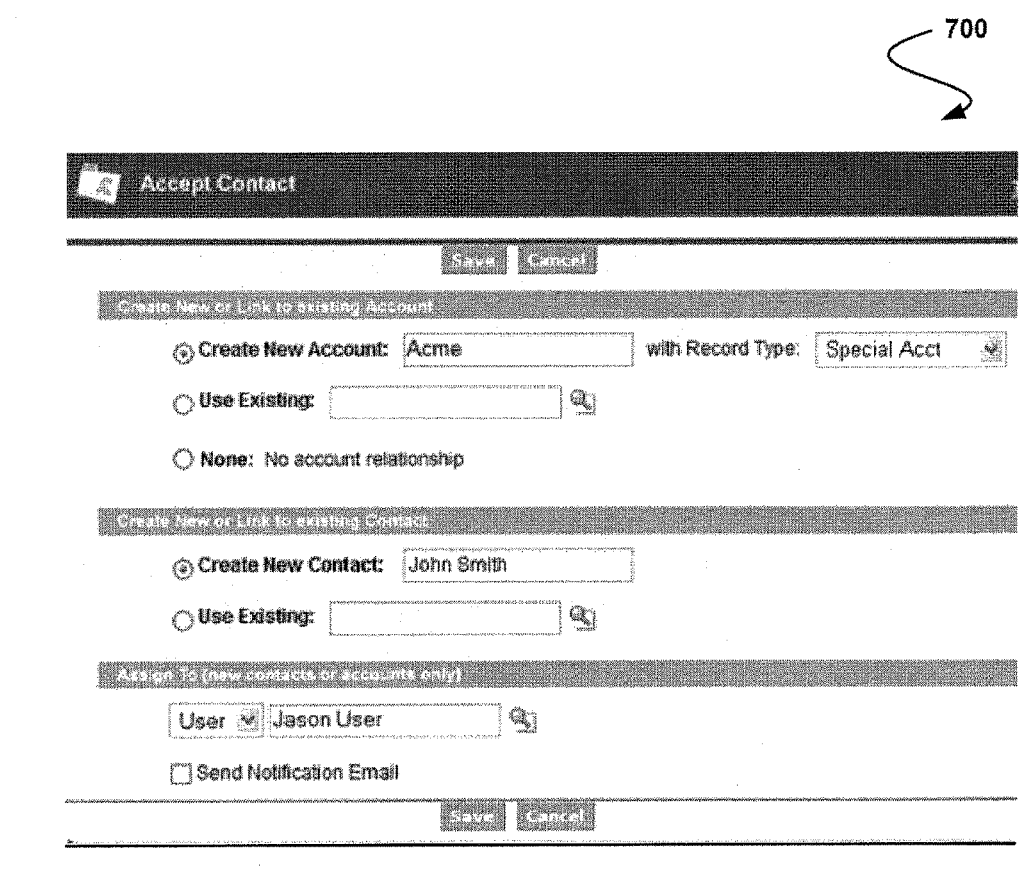

FIG. 7 shows a GUI 700 for accepting a shared contact, in accordance with yet another embodiment. As an option, the present GUI 700 may be implemented in the context of the functionality of FIGS. 1-6. Of course, however, the GUI 700 may be implemented in any desired environment. Again, the aforementioned definitions may apply during the present description.

As shown, various options may be provided via the GM 700 for accepting sharing of a contact. In one embodiment, the sharing of the contact may be accepted by creating an account to be associated with the contact as a new account. As an option, the account may be created by entering an account record type. In another embodiment, the sharing of the contact may be accepted by selecting an existing account (e.g. of the tenant accessing the GUI 700) with which the shared account is to be integrated. Of course, in another embodiment, the sharing of the contact may be accepted without creating a new account or selecting an existing account.

Further, the sharing of the contact may be accepted by creating a new contact to be stored in association with information of the tenant or selecting an existing contact of the tenant and integrating (e.g. linking) the contact with the existing contact. As another option, if a new contact is created via the GUI 700, as described above, a user (of the tenant) to which the contact is assigned may be configured. The GUI 700 may also provide an option to send a notification (e.g. email) to such user informing the user of the new contact.

If the contact is automatically being shared as a result of selection of an option to share child records for a parent record (e.g. account) of the contact being shared, the GUI 700 may optionally only be allowed to create a new contact or select and existing contact with the options to create an account or select an existing account being disabled, such that account selection is defaulted to the related parent account.

In other various embodiments (not necessarily limited to the present GUI 700), sent and received connection name fields may be available for the contact object. Additionally, the same fields may also be made available to show a message at the top of a shared record. Further, a history may also be displayed (via reports, via a GUI, etc.) in which updates on contacts, records, etc. from other tenants with which such contacts, records, etc. are shared are tracked.

System Overview

Figure 8:
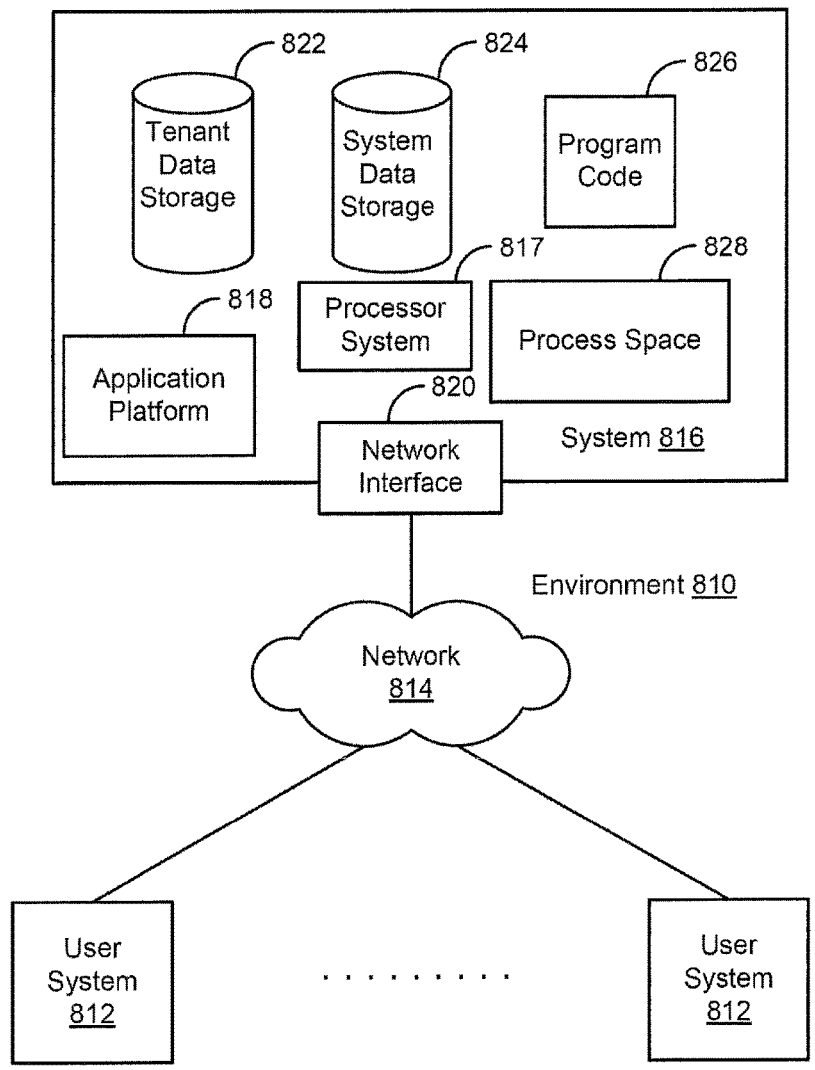
FIG. 8 illustrates a block diagram of an example of an environment wherein an on-demand database service might be used.

FIG. 8 illustrates a block diagram of an environment 810 wherein an on-demand database service might be used. As an option, any of the previously described embodiments of the foregoing figures may or may not be implemented in the context of the environment 810. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Figure 9:
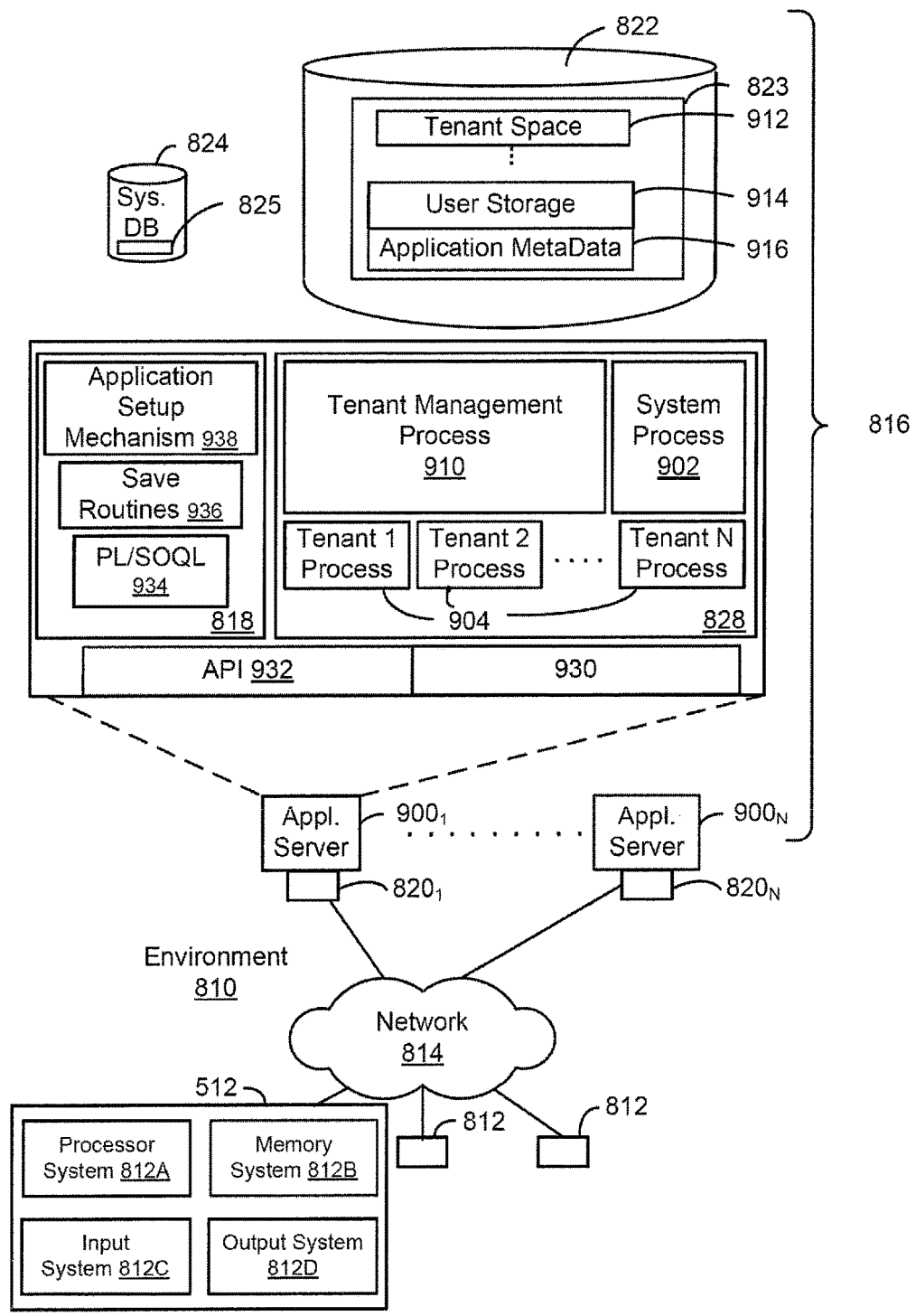
FIG. 9 illustrates a block diagram of an embodiment of elements of FIG. 8 and various possible interconnections between these elements.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 9 (and in more detail in FIG. 9) user systems 812 might interact via a network with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical rote model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 9, including a network interface 820, application platform 818, tenant data storage 822 for tenant data 823, system data storage 824 for system data accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817 of FIG. 8, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof may also be stored in any other volatile or non-volatile memory medium or device as is well known, such as a ROM or RAM, or provided on any media capable of storing program code, such as any type of rotating media including floppy disks, optical discs, versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825. User Interface (UI) 930, Application Program interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 804 managed by tenant management process 910 for example. Invocations to such applications may be coded using PL/SOQL 934 that provides a programming language style interface extension to API 932. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Mar. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; and/or US 2009/0030906, title "METHOD AND SYSTEM FOR SHARING DATA BETWEEN SUBSCRIBERS OF A MULTI-TENANT DATABASE SERVICE," filed Jun. 24, 2008, which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
    receiving, by one or more processors, permission from a first subscriber of a database service granting a second subscriber of the database service access to a portion of first subscriber information owned by the first subscriber, wherein the portion of the first subscriber information includes a plurality of records and the permission includes permission granting the second subscriber access to child records of the plurality of records, wherein the first subscriber information is stored by the database service separate from second subscriber information owned by the second subscriber, and wherein the second subscriber is otherwise blocked from accessing the first subscriber information;
    inserting, by the one or more processors, the portion of the first subscriber information into the second subscriber information;
    determining, by the one or more processors, that a first parent record of the first subscriber corresponds to a second parent record of the second subscriber, wherein the first parent record is a parent to the portion of the first subscriber information; and
    linking, by the one or more processors, the portion of the first subscriber information inserted into the second subscriber information to the second parent record based on the determination that the first parent record of the first subscriber corresponds to the second parent record of the second subscriber.

2. The method of claim 1, wherein the first subscriber includes a first tenant of the database service and the second subscriber includes a second tenant of the database service, wherein the first tenant is a different tenant of the database service than the second tenant.

3. The method of claim 1, wherein permission from the first subscriber granting the second subscriber access to the portion of first subscriber information is provided using a mark-up language.

4. The method of claim 1, wherein the first subscriber information is selected from the group consisting of: tasks, accounts, contacts, products, opportunities, cases, and comments.

5. The method of claim 1, wherein the first subscriber information includes at least two of: tasks, accounts, contacts, products, opportunities, cases, and comments.

6. The method of claim 1, wherein first subscriber information is stored in a database of the database service.

7. The method of claim 1, further comprising permitting the second subscriber to view the portion of first subscriber information.

8. The method of claim 1, further comprising permitting the second subscriber to update the portion of first subscriber information.

9. The method of claim 1, further comprising receiving from the first subscriber second permission granting a third subscriber of the database service access to the portion of the first sub scriber information.

10. The method of claim 9, further comprising inserting the portion of the first subscriber information into third subscriber information owned by the third subscriber, determining that the first parent record of the first subscriber corresponds to a third parent record of the third subscriber, and linking the portion of the first subscriber information inserted into the third subscriber information to the third parent record based on the determination that the first parent record of the first subscriber corresponds to the third parent record of the third subscriber.

11. The method of claim 10, wherein the permission and the second permission are separate such that subsequently blocking one of the permission and the second permission prevents an impact on the other one of the permission and the second permission.

12. The method of claim 1, wherein receiving the permission comprises receiving the permission via a graphical user interface of the database service.

13. The method of claim 1, wherein the database service stores the first subscriber information and the second subscriber information in a same data storage.

14. An apparatus, comprising:
    a processor; and
    a memory storing sequences of instructions which, when executed by the processor, cause the processor to perform operations comprising:
    receiving permission from a first subscriber of a database service granting a second subscriber of the database service access to a portion of first subscriber information owned by the first subscriber, wherein the portion of the first subscriber information includes a plurality of records and the permission includes permission granting the second subscriber access to child records of the plurality of records, wherein the first subscriber information is stored by the database service separate from second subscriber information owned by the second subscriber, and wherein the second subscriber is otherwise blocked from accessing the first subscriber information;

inserting the portion of the first subscriber information into the second subscriber information;

determining that a first parent record of the first subscriber corresponds to a second parent record of the second subscriber, wherein the first parent record is a parent to the portion of the first subscriber information; and linking the portion of the first subscriber information inserted into the second subscriber information to the second parent record based on the determination that the first parent record of the first subscriber corresponds to the second parent record of the second subscriber.

15. The apparatus of claim 14, wherein receiving the permission comprises receiving the permission via a graphical user interface of the database service.

16. A non-transitory computer readable medium having computer program code embodied therein, the computer program code configured to be executed to cause a computer to implement a method comprising:

receiving permission from a first subscriber of a database granting a second subscriber of the database service access to a portion of first subscriber information owned by the first subscriber, wherein the portion of the first subscriber information includes a plurality of records and the permission includes permission granting the second subscriber access to child records of the plurality of records, wherein the first subscriber information is stored by the database service separate from second subscriber information owned by the second subscriber, and wherein the second subscriber is otherwise blocked from accessing the first subscriber information;

inserting the portion of the first subscriber information into the second subscriber information;

determining that a first parent record of the first subscriber corresponds to a second parent record of the second subscriber, wherein the first parent record is a parent to the portion of the first subscriber information; and linking the portion of the first subscriber information inserted into the second subscriber information to the second parent record based on the determination that the first parent record of the first subscriber corresponds to the second parent record of the second subscriber.

17. The non-transitory computer readable medium of claim 16, wherein receiving the permission comprises receiving the permission via a graphical user interface of the database service.

* * * * *